(12) United States Patent
Bloom

(10) Patent No.: US 6,177,985 B1
(45) Date of Patent: *Jan. 23, 2001

(54) APPARATUS AND METHOD FOR TESTING OPTICAL FIBER SYSTEM COMPONENTS

(76) Inventor: Cary Bloom, 5272 River Rd., Bethesda, MD (US) 20816

( * ) Notice: Under 35 U.S.C. 154(b), the term of this patent shall be extended for 0 days.

This patent is subject to a terminal disclaimer.

(21) Appl. No.: 08/884,655

(22) Filed: Jun. 27, 1997

Related U.S. Application Data

(63) Continuation-in-part of application No. 08/725,651, filed on Oct. 1, 1996, now Pat. No. 5,764,348.
(60) Provisional application No. 60/040,875, filed on Mar. 21, 1997.

(51) Int. Cl.[7] .................................................. G01N 21/00
(52) U.S. Cl. .............................................................. 356/73.1
(58) Field of Search ............................................. 356/73.1

(56) References Cited

U.S. PATENT DOCUMENTS

| Re. 33,296 | 8/1990 | Stowe et al. . |
| Re. 34,955 | 5/1995 | Anton et al. . |

(List continued on next page.)

FOREIGN PATENT DOCUMENTS

| 0 293 289 | 11/1985 | (GB) . | |
| 0 215 668 | 3/1987 | (GB) . | |
| 0 411 956 | 2/1991 | (GB) . | |
| 2 235 043 | 2/1991 | (GB) . | |
| 2235043 * | 2/1991 | (GB) | ................................... 356/73.1 |
| 07012680 | 1/1995 | (JP) . | |
| 07083795 | 3/1995 | (JP) . | |
| WO87/00934 | 2/1987 | (WO) . | |

OTHER PUBLICATIONS

"Control of Optical Fibre Taper Shape", Electronics Letters, vol. 27, No. 18, Aug. 29, 1991, pp. 1654–1656.
"Loss and Spectral Control in Fused Tapered Couplers", by K.P. Oakley et al., Optical Engineering, vol. 33, No. 12, Dec. 1994, pp. 4006–4019.
"The Shape of Fiber Tapers", by T.A. Birks et al., Journal of Lightwave Technology, IEEE, vol. 10, No. 4, Apr. 1992, pp. 432–438.
"Tapered Optical Fiber Components and Sensors", by L.C. Bobb, et al., Microwave Journal, May 1992.
"Automated Fabrication of Fused Fibre Optic Couplers", by Robert Frank Swain, dissertation, Heriot–Watt University, Edinburgh, Ireland (1993).
"Fibre–optic Coupler Fabrication at AOFR", by A.J. Stevenson et al., International Journal of Optoelectronics, vol. 6, Nos. 1/2, 1991, pp. 127–144.

(List continued on next page.)

*Primary Examiner*—Frank G. Font
*Assistant Examiner*—Tu T. Nguyen
(74) *Attorney, Agent, or Firm*—Irah H. Donner; Hale & Dorr LLP

(57) ABSTRACT

An optical switching assembly selectively connects an optical source and a detector to at least one fiber optic device. The assembly includes first and second groups of optical paths, and first and second optical switches. The first optical switch selectively connects the optical source to one end of the first group of optical paths, and the second optical switch selectively connects the detector to the one end of the second group of optical paths. The assembly laos includes a plurality of junctions, each having a lead associated therewith, and one or more of the leads are connected to the fiber optic device. The junctions connect the other end of the first group of optical paths and the other end of the second group of optical paths to the lead to facilitate the testing of the fiber optic device.

24 Claims, 15 Drawing Sheets

U.S. PATENT DOCUMENTS

| | | |
|---|---|---|
| 3,854,003 | 12/1974 | Duret . |
| 4,026,632 | 5/1977 | Hill et al. . |
| 4,611,884 | 9/1986 | Roberts . |
| 4,699,453 | 10/1987 | Roberts . |
| 4,701,010 | 10/1987 | Roberts . |
| 4,714,316 | 12/1987 | Moore et al. . |
| 4,763,977 | 8/1988 | Kawasaki et al. . |
| 4,772,085 | 9/1988 | Moore et al. . |
| 4,779,945 | 10/1988 | Hill et al. . |
| 4,792,203 | 12/1988 | Nelson et al. . |
| 4,798,438 | 1/1989 | Moore et al. . |
| 4,834,481 | 5/1989 | Lawson et al. . |
| 4,895,423 | 1/1990 | Bilodeau et al. . |
| 4,900,119 | 2/1990 | Hill et al. . |
| 4,906,068 | 3/1990 | Olson et al. . |
| 4,923,273 | 5/1990 | Taylor . |
| 4,957,338 | 9/1990 | Thorncraft et al. . |
| 4,995,688 | 2/1991 | Anton et al. . |
| 4,997,243 | 3/1991 | Aiki et al. . |
| 4,997,245 | 3/1991 | DuPay et al. . |
| 4,997,247 | 3/1991 | Stowe . |
| 4,997,248 | 3/1991 | Stowe . |
| 4,997,252 | 3/1991 | Sugawara et al. . |
| 4,997,253 | 3/1991 | Enochs . |
| 5,013,117 | 5/1991 | Fukuma . |
| 5,013,121 | 5/1991 | Anton et al. . |
| 5,028,110 | 7/1991 | Plummer . |
| 5,031,994 | 7/1991 | Emmons . |
| 5,037,176 | 8/1991 | Roberts et al. . |
| 5,066,149 | 11/1991 | Wheeler et al. . |
| 5,067,678 | 11/1991 | Henneberger et al. . |
| 5,093,885 | 3/1992 | Anton . |
| 5,121,453 | 6/1992 | Orazi et al. . |
| 5,123,219 | 6/1992 | Beard et al. . |
| 5,136,121 | 8/1992 | Kluska et al. . |
| 5,157,751 | 10/1992 | Maas et al. . |
| 5,159,655 | 10/1992 | Ziebol et al. . |
| 5,166,992 | 11/1992 | Cassidy et al. . |
| 5,166,994 | 11/1992 | Stowe et al. . |
| 5,179,608 | 1/1993 | Ziebol et al. . |
| 5,179,618 | 1/1993 | Anton . |
| 5,189,723 | 2/1993 | Johnson et al. . |
| 5,208,894 | 5/1993 | Johnson et al. . |
| 5,214,732 | 5/1993 | Beard et al. . |
| 5,214,735 | 5/1993 | Henneberger et al. . |
| 5,222,176 | 6/1993 | Webber et al. . |
| 5,239,604 | 8/1993 | Ziebol et al. . |
| 5,251,002 | 10/1993 | Gryk . |
| 5,261,019 | 11/1993 | Beard et al. . |
| 5,274,731 | 12/1993 | White . |
| 5,283,852 | 2/1994 | Gibler et al. . |
| 5,293,440 | 3/1994 | Miles et al. . |
| 5,293,582 | 3/1994 | Beard et al. . |
| 5,305,405 | 4/1994 | Emmons et al. . |
| 5,316,243 | 5/1994 | Henneberger . |
| 5,317,663 | 5/1994 | Beard et al. . |
| 5,319,728 | 6/1994 | Lu et al. . |
| 5,319,733 | 6/1994 | Emmons et al. . |
| 5,329,600 | 7/1994 | Sasaoka et al. . |
| 5,343,544 | 8/1994 | Boyd et al. . |
| 5,355,426 | 10/1994 | Daniel et al. . |
| 5,363,465 | 11/1994 | Korkowski et al. . |
| 5,367,591 | 11/1994 | Seike et al. . |
| 5,381,497 | 1/1995 | Toland et al. . |
| 5,386,484 | 1/1995 | Ooka et al. . |
| 5,386,488 | 1/1995 | Oikawa . |
| 5,386,490 | 1/1995 | Pan et al. . |
| 5,395,101 | 3/1995 | Takimoto et al. . |
| 5,422,969 | 6/1995 | Eno . |
| 5,432,875 | 7/1995 | Korkowski et al. . |
| 5,445,319 | 8/1995 | Pan et al. . |
| 5,459,598 | 10/1995 | Carrington . |
| 5,463,704 | 10/1995 | Ziebol . |
| 5,475,780 | 12/1995 | Mizrahi . |
| 5,475,782 | 12/1995 | Ziebol . |
| 5,475,784 | 12/1995 | Bookbinder et al. . |
| 5,497,444 | 3/1996 | Wheeler . |
| 5,577,149 | 11/1996 | Averbeck et al. . |
| 5,588,087 | 12/1996 | Emmons et al. . |
| 5,602,952 | 2/1997 | Rashleigh et al. . |

OTHER PUBLICATIONS

"Fiber–Coupler Fabrication with Automatic Fusion–Elongation Processes for Low Excess Loss and High Coupling–Ratio Accuracy", by I. Yokohama, et al., Journal of Lightwave Technology, IEEE, vol. LT–5, No. 7, Jul. 1987.

"Premise Wiring Communication Fiber Optics", FIS, 1997 15th Edition.

Schleuniger, "Schleuniger PF1000/PF2000", Electric Demand Prefeeders.

Schleuniger, "CP 1200 Coiling Unit".

Schleuniger, "Schleuniger WS 1500/CP1250", Wire Stacker/Coiling Pan.

Schleuniger, "Schleuniger FO 7010", Kevlar Cutting Machine.

Schleuniger, "Schleuniger US 2545", Stripping Machine.

Schleuniger, "All Product Brochure".

International Preliminary Examination Report for International application No. PCT/US97/16169.

* cited by examiner

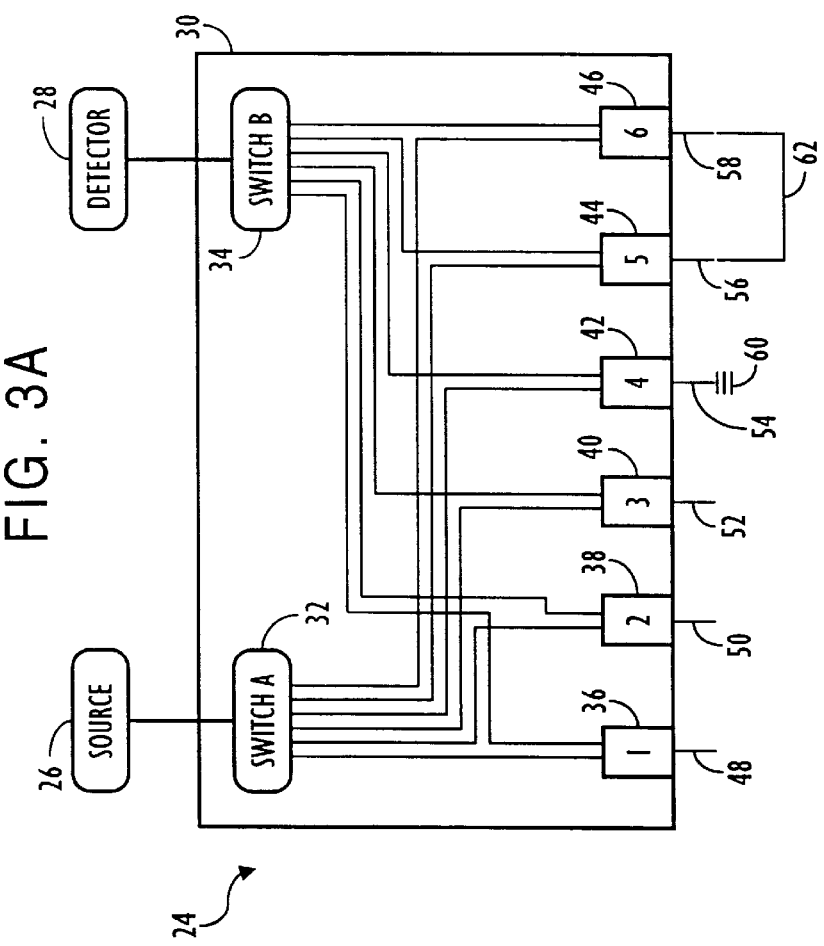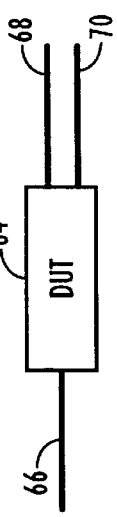

APPARATUS AND METHOD FOR TESTING OPTICAL FIBER SYSTEM COMPONENTS

RELATED APPLICATIONS

This application claims priority from U.S. provisional application 60/040,875, filed on Mar. 21, 1997, incorporated herein by reference. This application is a continuation-in-part application of U.S. application Ser. No. 08/725,651, now U.S. Pat. No. 5,764,348 filed on Oct. 1, 1996, incorporated herein by reference.

BACKGROUND OF THE INVENTION

1. Field of the Invention

The present invention relates to switching assemblies, and more specifically, to switching assemblies, and/or optical switches used for testing optical fibers, devices, and/or fiber optic devices, such as fiber optic couplers. The present completely, accurately, and reliably tests a fiber optic device for some, many and/or all relevant optical characteristics.

2. Background of the Related Art

Fiber optic devices are typically tested after manufacture to determine their optical characteristics. For example, attenuators may be tested to determine the actual attenuation of the device, and fiber optic couplers may be tested to determine the coupling ratio at selected wavelengths and polarizations.

Currently, various techniques and/or switching assemblies are available for testing of fiber optic devices. For example, FIGS. 1A–1B illustrate one testing assembly disclosed in United Kingdom Patent Application 2235043A to Philip C. Longhurst, incorporated herein by reference. In FIG. 1A, an optical measurement system measures insertion loss of each fibre in sequence of a multi-fibre connector 15 connected to an optical fibre ribbon 16 to be obtained using light source 17, 18 and detector 22 of the system. A multi-channel optical switch 1 is connected to a light source 17, 18. A 1×2 bi-directional splitter 2 is optically coupled between each of the switch channels 4 and a respective fibre 8 of a standard multi-fibre connector 3 mating with the connector 15 to be tested. Optical fiber 5 is fusion spliced at 6 to the channel 4 and to one of the fibers 8 of an optical fiber ribbon 7 connected to the connector 3 by an optical fiber 9 which is fusion spliced at 10.

FIG. 1B is an illustration when the optical measurement system is used to monitor and record the return loss between the pair of optical fibers interconnected by the mating of the standard multi-fibre connector 3 and the multi-fibre connector 15 under test. To perform the return loss test, the adaptor 21 and large area detector 22 (shown in FIG. 1A) are disconnected and removed from the end of the optical fibre ribbon 16. The free end of the optical fibre ribbon 16 is immersed in an index matching gel 23 from which no light will be reflected. The testing for the return loss is then conducted using light source 17, 18 and additional detectors 19, 20.

Thus, in the Longhurst reference, the testing procedure is complex and cumbersome. Further, all desired properties of the fiber optic device cannot be tested without additional connections being made, and/or operations being conducted and/or additional testing equipment being required, between different test procedures. Thus, the testing system in the Longhurst reference is inefficient and not sufficiently and/or adequately automated.

FIG. 2 is an illustration of another prior art switching assembly; that is, the transmission measurement facility described in Bellcore Generic Requirements for Fiber Optic Branching Components, Bellcore GR-1209-CORE, Issue 1, November 1994, incorporated herein by reference. The source switch 112 is used to launch light from one of sources 104 selected via switch 106 into any of the devices under test 108 in environmental chamber 110. The detector switch 114 connects any DUT 108 to the power meter 118, measuring transmitted power and reflected power. The coupler 116 directs the optical power reflected by the DUT 108 to port (r) on Switch 114 for detection. A reference fiber 120, located at port (m) of Switches 112, 114 is used to correct for variations in source power over time. A reflectance reference 122 is located at port (r) of Switch 112, and is used to calculate reflectance from the measured optical power.

Insertion loss is calculated by subtracting the power transmitted through the reference fiber 120 from the power transmitted through the DUT 108. Reflectance is calculated by subtracting the power reflected by the reflectance reference 122 from the power reflected by the DUT 108. The Switches, Power Meter and Environmental Chambers are computer controlled via GPIB interface. However, I have realized that this switching assembly (suggested for use for environmental testing of fiber optic devices) cannot be used to collect and/or capture sufficient data to define a full transfer matrix needed to calculate/determine the prescribed device characteristics for adequate and/or sufficient fiber optic device testing. For example, this switching assembly cannot obtain or collect directivity and/or near end crosstalk measurements of a fiber optic device.

It is therefore desirable to provide a testing assembly capable of completely, accurately, and reliably testing a fiber optic device for some, most, and/or all relevant optical characteristics.

It is also desirable to provide a testing assembly capable of completely, accurately, and reliably testing a fiber optic device, such as an optical fiber biconical taper (FBT) coupler.

It is also desirable to provide a testing assembly capable of completely, accurately, rapidly, and reliably testing a fiber optic device without altering or changing the test configuration and/or testing equipment.

It is also desirable to provide a testing assembly capable of completely, accurately, rapidly, and reliably testing a fiber optic device without requiring the connections between the testing device and the device under test (DUT) to be altered or changed during the testing operation.

It is also desirable to provide a testing assembly capable of completely, accurately, rapidly, and reliably testing a fiber optic device without altering or changing the test configuration and/or testing equipment, while also connecting to, and/or disconnecting from, and/or simultaneously testing, another device under test.

SUMMARY OF THE INVENTION

It is a feature and advantage of the present invention in providing a testing assembly capable of completely, accurately, and reliably testing a fiber optic device for all relevant optical characteristics.

It is another feature and advantage of the present invention in providing a testing assembly capable of completely, accurately, and reliably testing a fiber optic device such as an optical fiber biconical taper (FBT) coupler.

It is another feature and advantage of the present invention in providing a testing assembly capable of completely, accurately, and reliably testing a fiber optic device without altering or changing the test configuration and/or testing equipment.

It is another feature and advantage of the present invention in providing a testing assembly capable of completely, accurately, and reliably testing a fiber optic device without requiring the connections between the testing device and the device under test (DUT) to be altered or changed during the testing operation.

It is another feature and advantage of the present invention in providing a testing assembly capable of completely, accurately, rapidly, and reliably testing a fiber optic device without altering or changing the test configuration and/or testing equipment, while also connecting to, and/or disconnecting from, and/or simultaneously testing, another device under test.

The present invention is based, in part, on the realization or identification of the problem that during testing of fiber optic devices, the testing equipment and/or the fiber optic devices require manual intervention during the testing program before the fiber optic device can be completely and adequately tested. This requires much effort to be expended by personnel running or implementing the testing program, thereby creating many inefficiencies in the entire process of testing a fiber optic device.

Advantageously, I have discovered that it is possible to fully test a fiber optic device in accordance with a predetermined testing program without requiring changes in testing equipment, and/or connections between the testing equipment and the device under test. Further, I have discovered that a switching assembly can be designed that efficiently and effectively connects a testing device to a device under test.

In accordance with one embodiment of the invention, an optical switching assembly selectively connects an optical source and a detector to at least one fiber optic device. The assembly includes first and second groups of optical paths, and first and second optical switches. The first optical switch selectively connects the optical source to one end of one of the first groups of optical paths, and the second optical switch selectively connects the detector to the one end of one of the second groups of optical paths. The assembly also includes a plurality of junctions, each having a lead associated therewith, and one or more of the leads are connected to the fiber optic device. The junctions each connect the other end of one of the first groups of optical paths and the other end of one of the second groups of optical paths to a lead to facilitate the testing of the fiber optic device.

According to another embodiment of the invention, an optical switching assembly selectively connects an optical source and a detector to at least one fiber optic device having at least n-leads. The assembly includes a junction device having at least n-junctions respectively connected to the n-leads of the fiber optic device. The assembly also includes an optical switch selectively connecting the optical source to each of the n-junctions, and selectively connecting the detector to each of the n-junctions.

Methods for using the optical switching assembly for testing two devices substantially simultaneously, for testing one device while another device is being connected to/disconnected from the optical switching assembly, for performing two tests on one device substantially simultaneously, and the like, are also provided.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 3A shows a schematic diagram of an optical testing apparatus;

FIG. 3B shows a representation of a 1×2 FBT coupler to be tested shown as the device under test (DUT);

DESCRIPTION OF PREFERRED EMBODIMENT OF THE INVENTION

Figure 1A:
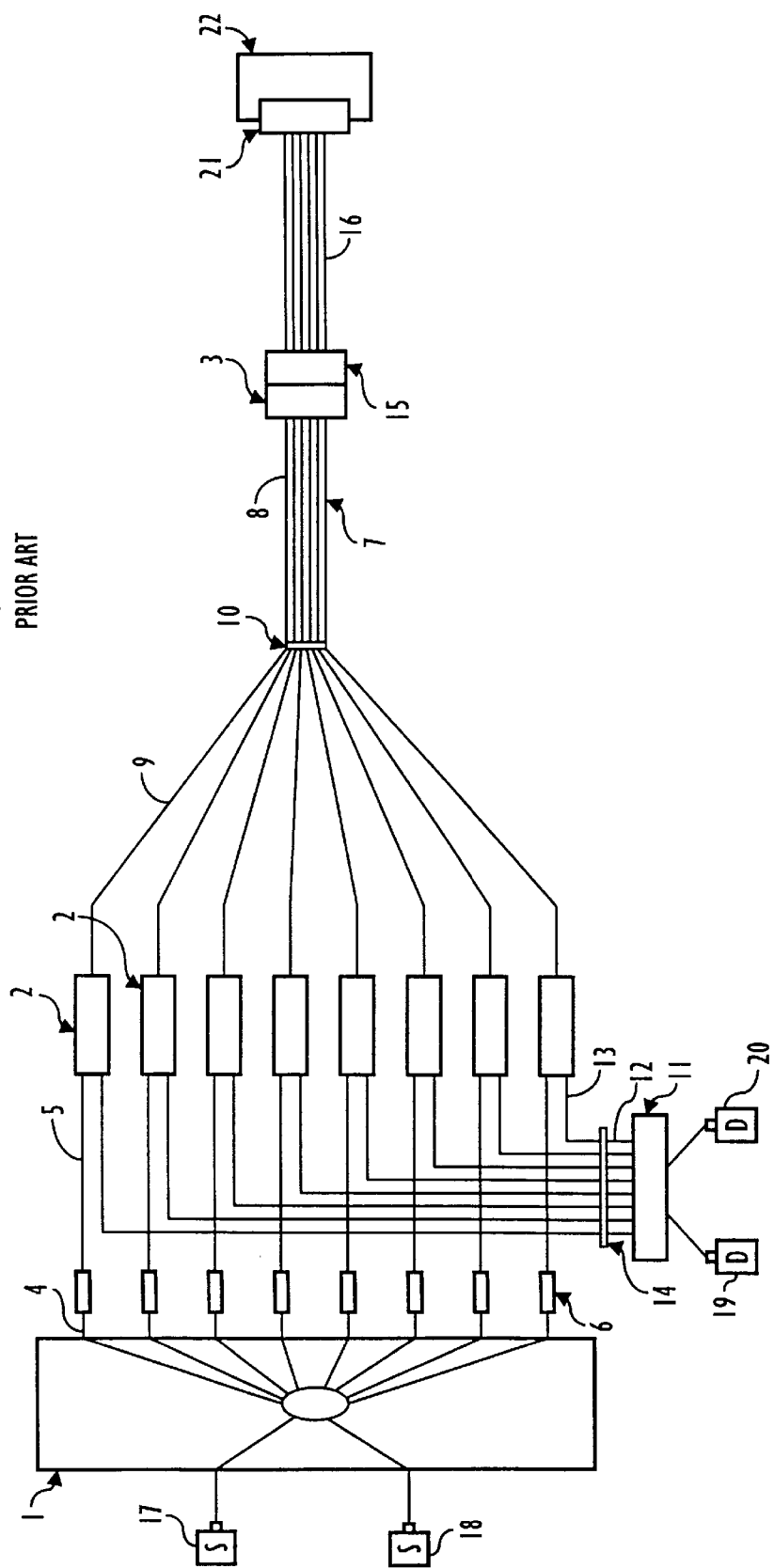
FIG. 1A is an illustration of a prior art optical measurement system configured to be used to monitor and record the insertion loss between the pair of optical fibers interconnected by the mating of the standard multi-fibre connector and the multi-fibre connector under test.
Figure 1B:
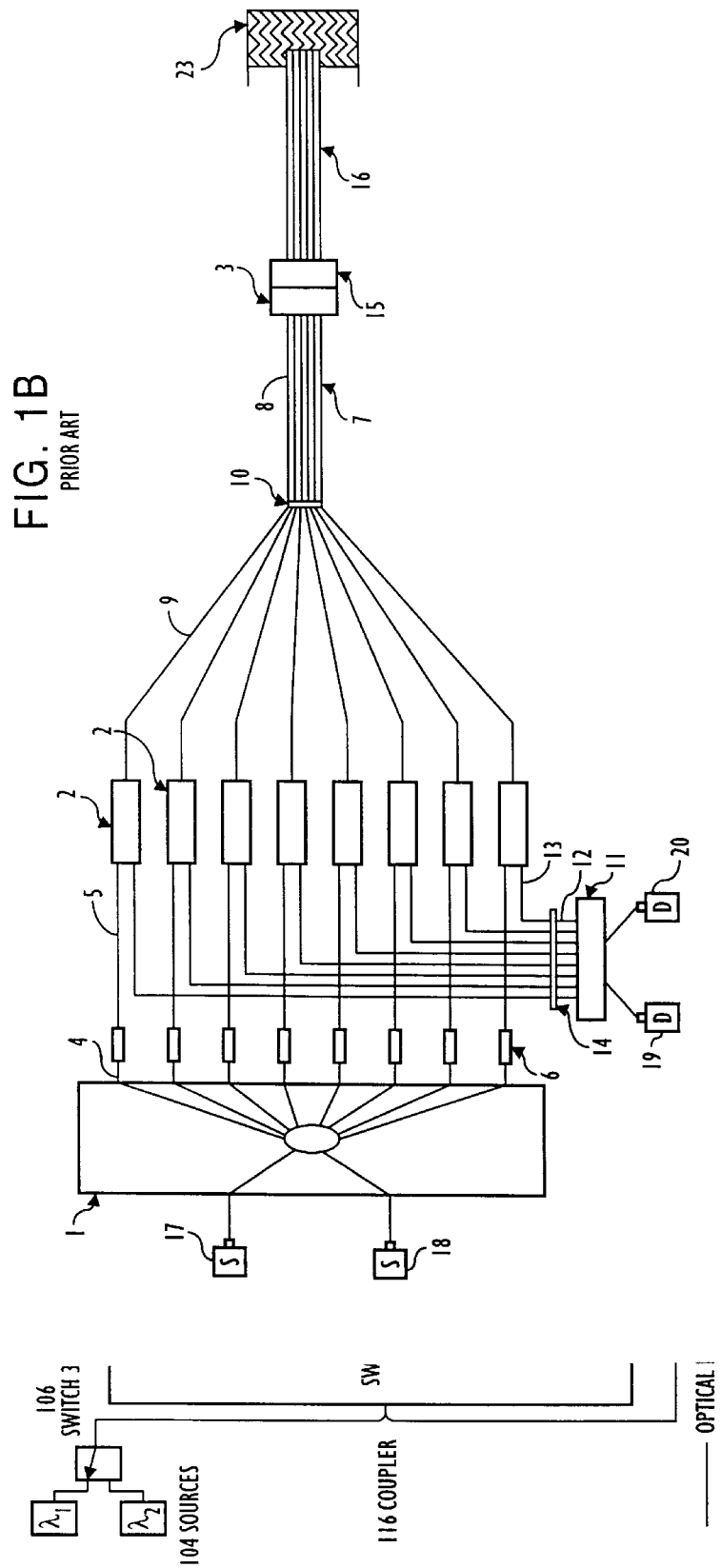
FIG. 1B is an illustration of the prior art optical measurement system, shown in FIG. 1A, configured to be used to monitor and record the return loss between the pair of optical fibers interconnected by the mating of the standard multi-fibre connector and the multi-fibre connector under test.
Figure 2:
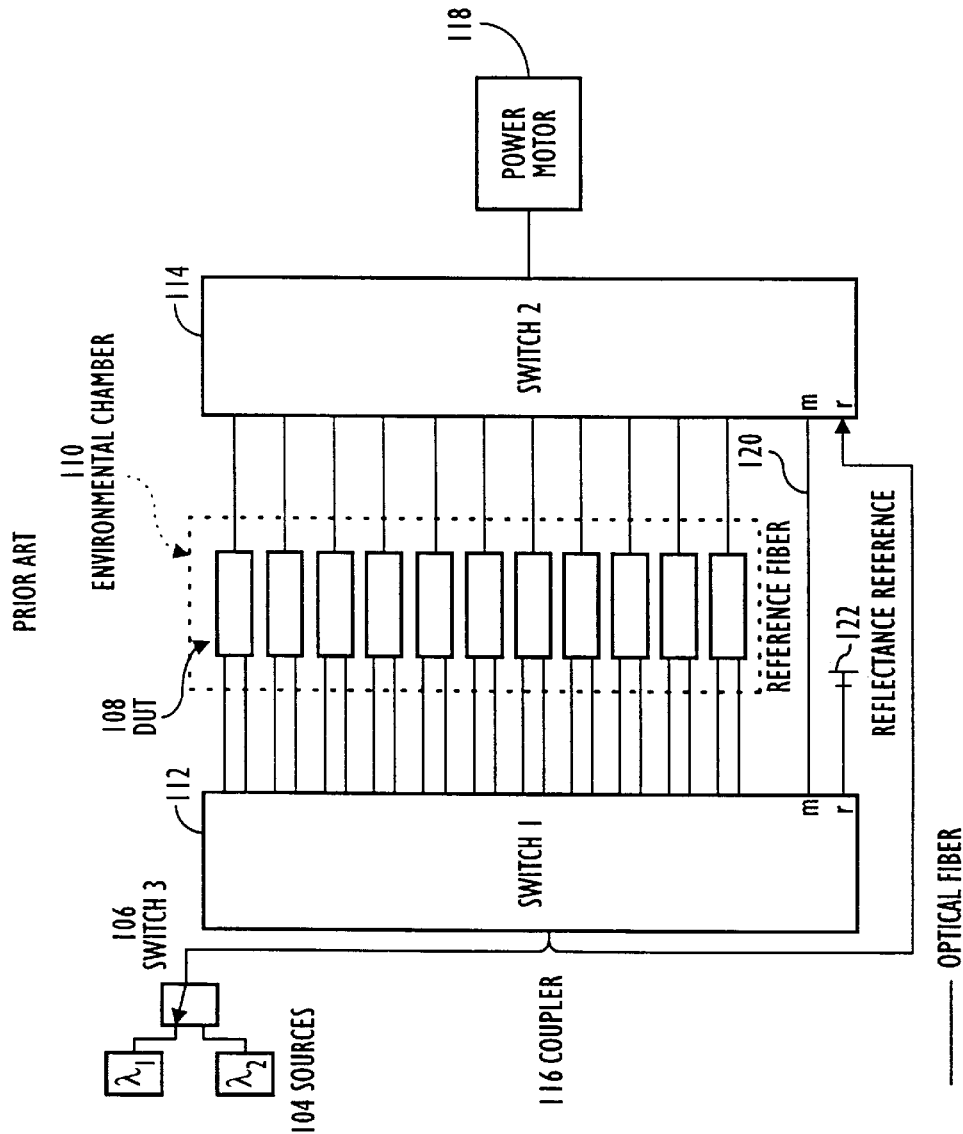
FIG. 2 is an illustration of a prior art transmission measurement facility described in Bellcore Generic Requirements for Fiber Optic Branching Components.

The present invention is used on, and provides efficient, accurate, rapid and reliable testing of, optical fibers, devices and/or fiber optic devices (hereinafter "fiber optic device") such as couplers, switches, wave-division multiplexers (WDM), filters, attenuators, polarizers, waveguides, sensors, wideband fiber optic couplers, fiber optic connectors, fiber optic amplifiers, fiber optic sensors and the like, that provide substantially similar optical responses, properties and/or indicators. These various fiber optic devices, such as the WDM, may be constructed of different materials such as glass, crystal, metal, plastic, ceramic and the like.

The present invention completely, accurately, and reliably tests a fiber optic device for all relevant optical characteristics. The present invention facilitates and/or performs the testing of optical characteristics of fiber optic devices such as couplers, switches, WDMs, and the like, to, for example, industry standard specifications, such as standard, published Bellcore (Bell Communications Research) Specifications 1209 and/or 1221, incorporated herein by reference.

One principal advantage of the method and/or apparatus described herein is that it allows the automatic and rapid testing of a fiber optic device for all relevant optical characteristics. A principal use of this method and/or apparatus is also in post-production testing for a passive fiber optic component manufacturer. This method and/or apparatus will quickly, reliably, and accurately test a fiber optic device, in a highly automated manner.

To illustrate this method, I will conceptually demonstrate the standard Bellcore 1209 optical testing of a 1×2 FBT coupler. The testing of other fiber optic devices would be similar (with the exception that some steps may be added and/or omitted based on the specific optical device being tested), including testing of single optical fibers and/or devices. In this description, the number of fiber optic device leads and testing apparatus connections have been minimized for clarity. The testing of other fiber optic devices with a different number of leads would be similar. A testing apparatus with a greater number of connections would allow devices with a greater number of leads, and/or a greater number of devices, to be tested.

FIG. 3A shows a schematic diagram of an optical testing apparatus 24. It includes a set of optical sources 26 (shown as Source), such as lasers, LEDs, etc., and methods to select and control the optical properties of those sources 26, such as polarizers, wavelength filters, etc. The optical testing apparatus 24 also includes a set of optical detectors 28 (shown as Detector), and methods to select and control the detectors 28 for measuring the optical properties being tested.

An optical switching assembly 30 (shown as large box below Source and Detector) is included for connecting the source 26 and the detector 28 to the device under test, described below in greater detail. The optical switching assembly 30 includes two 1×N optical switches 32, 34 (shown as switch A and switch P) and a set of 1×2 optical directional couplers 36, 38, 40, 42, 44 and 46 (shown as small boxes 1–6), each connected to both optical switches 32, 34 via optical paths (e.g., optical fiber, waveguide, free space, and the like).

A set of ports 48, 50, 52, 54, 56 and 58 (shown as small black vertical lines below the 1×2 couplers), attached to the optical couplers 36, 38, 40, 42, 44 and 46, are used to connect external devices to the optical switching assembly 30. Each optical coupler 36, 38, 40, 42, 44 and 46, connects each port 48, 50, 52, 54, 56 and 58 to both switch A 32, which directs input from the source 26, and switch B 34, which directs output to the detector 28.

This connection configuration gives each port 48, 50, 52, 54, 56 and 58 the ability to simultaneously act as both an input from the source 26 and an output to the detector 28. A reference optical reflector 60 (shown as black horizontal line 54 below port 4) may be permanently attached to port 4 indicated by reference numeral 54, and is used as a reference optical reflectance measurement standard. An optical patch cable 62 (shown as black line 56, 58 below port 5 and port 6) may permanently connect port 5 indicated by reference numeral 56 and port 6 indicated by reference numeral 58, and is used to calibrate and measure the optical power of the source 26.

FIG. 3B shows a representation of a 1×2 FBT coupler to be tested 64 (shown as the Device Under Test or DUT). To properly test this device, it is necessary to measure the distribution of optical power from each lead to all leads 66, 68 and/or 70.

Figure 4:
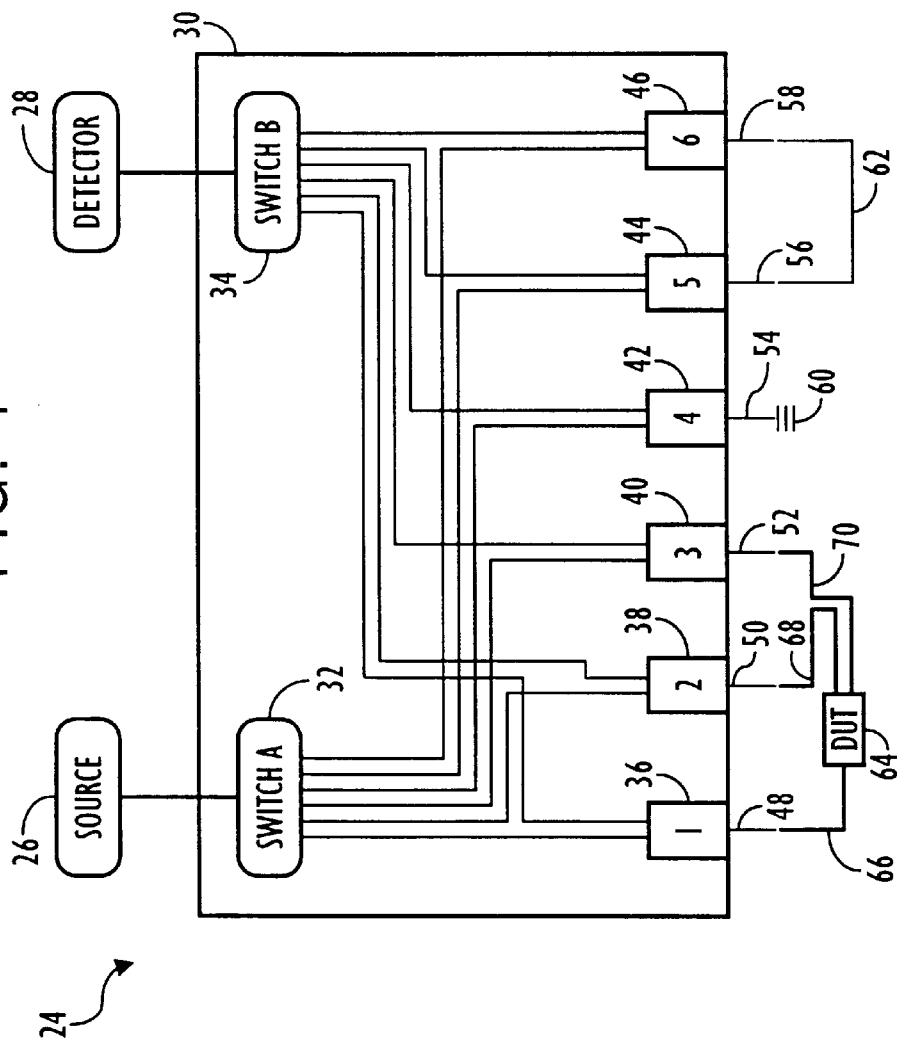
FIG. 4 shows the first step in this testing procedure is to connect the test device to the optical switching assembly.

FIG. 4 shows the first step in this testing procedure is to connect the device under test 64 to the optical switching assembly 30. To accomplish this, the leads 66, 68, 70 of the device under test 64 are preferably fusion spliced to connect to ports 48, 50, 52, respectively. Other forms of connection described herein, instead of fusion splicing, are possible, such as use of optical connectors, mechanical splices, free space connection, waveguides and the like. For clarity, optical connections under discussion will be emphasized by thicker black lines.

Figure 5:
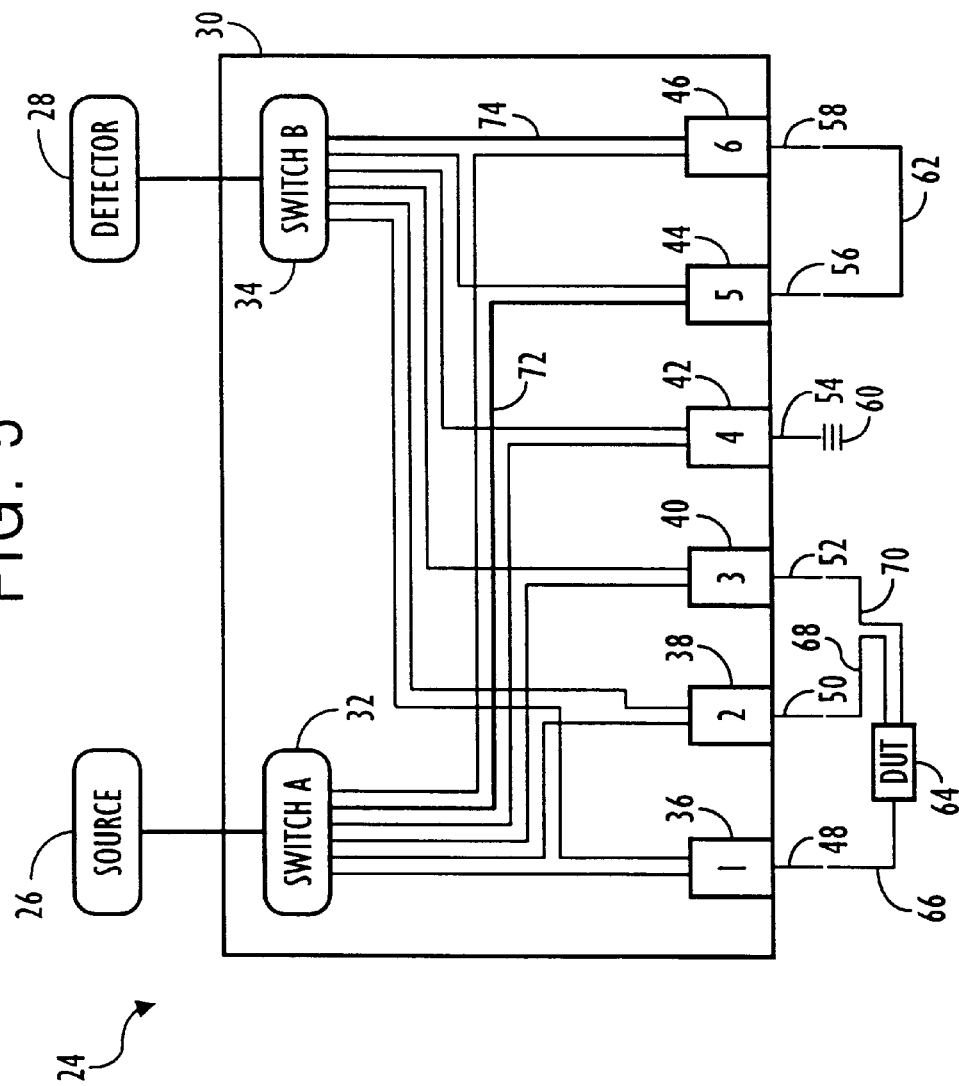
FIG. 5 shows the next step in the testing procedure is to obtain reference power values.

FIG. 5 shows the next step in the testing procedure is to obtain reference optical power and reflectance values. To determine reference optical power values, switch A 32 connects the source 26 to port 5 (reference numeral 56) via optical path or communication line 72 and optical directional coupler 5 (reference numeral 44), the optical patch cable 62 connects port 5 (reference numeral 56) to port 6 (reference numeral 58). Switch B 34 connects the detector 28 to port 6 (reference numeral 58) via optical path 74 and optical directional coupler 6 (reference numeral 46). The source 26 is now connected to the detector 28, and optical power measurements of the source 26 can be made by detector 28, and stored for later reference. Patch cable 62 can be any suitable device and/or optical path (e.g., free space) and/or means that connects and/or provides an optical connection between port 5 (reference numeral 56) and port 6 (reference numeral 58).

Figure 6:
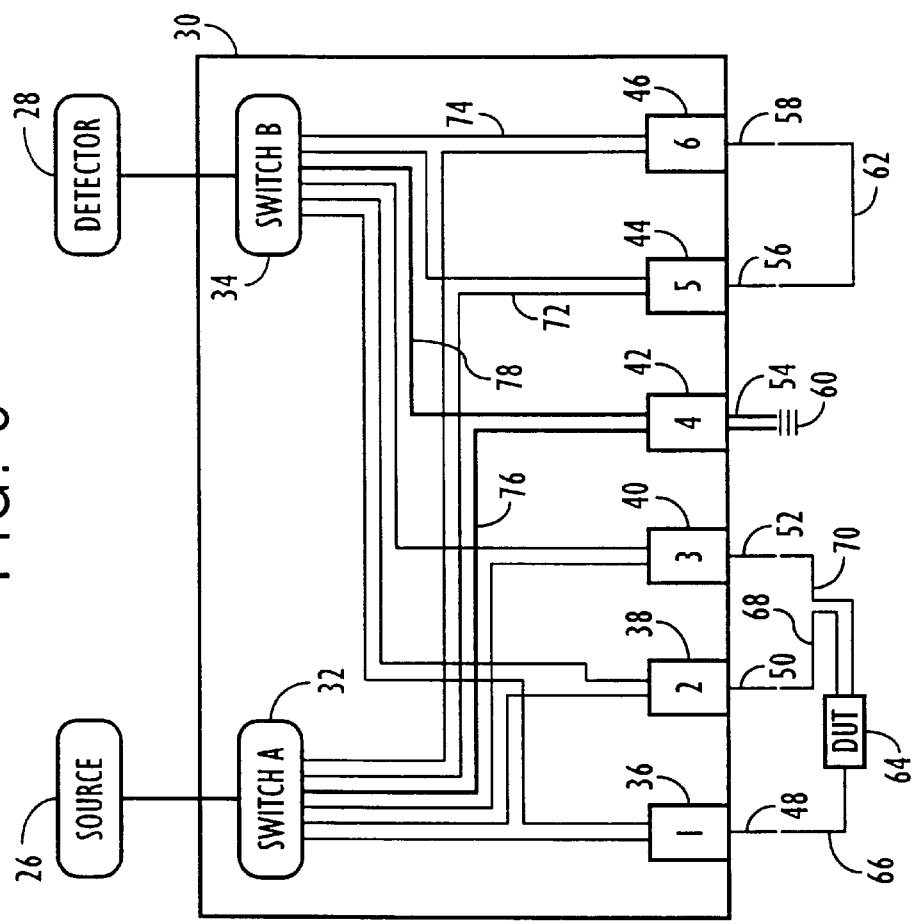
FIG. 6 is an illustration of the next step of obtaining reference reflectance values.

FIG. 6 is an illustration of the next step of determining reference optical reflectance values. In FIG. 6, to determine reference optical reflectance values, switch A 32 connects the source 26 to port 4 (reference numeral 54) via optical path 76 and optical directional coupler 4 (reference numeral 42). The reference optical reflector 60 is connected to port 4 (reference numeral 54) and reflects a predetermined amount of optical power back to port 4 (reference numeral 54). Switch B 34 connects port 4 (reference numeral 54) to the detector 28 via optical path 78 and optical directional coupler 42. Optical reflectance measurements of the source 26 can now be made by the detector 28, and stored for later reference.

Figure 7:
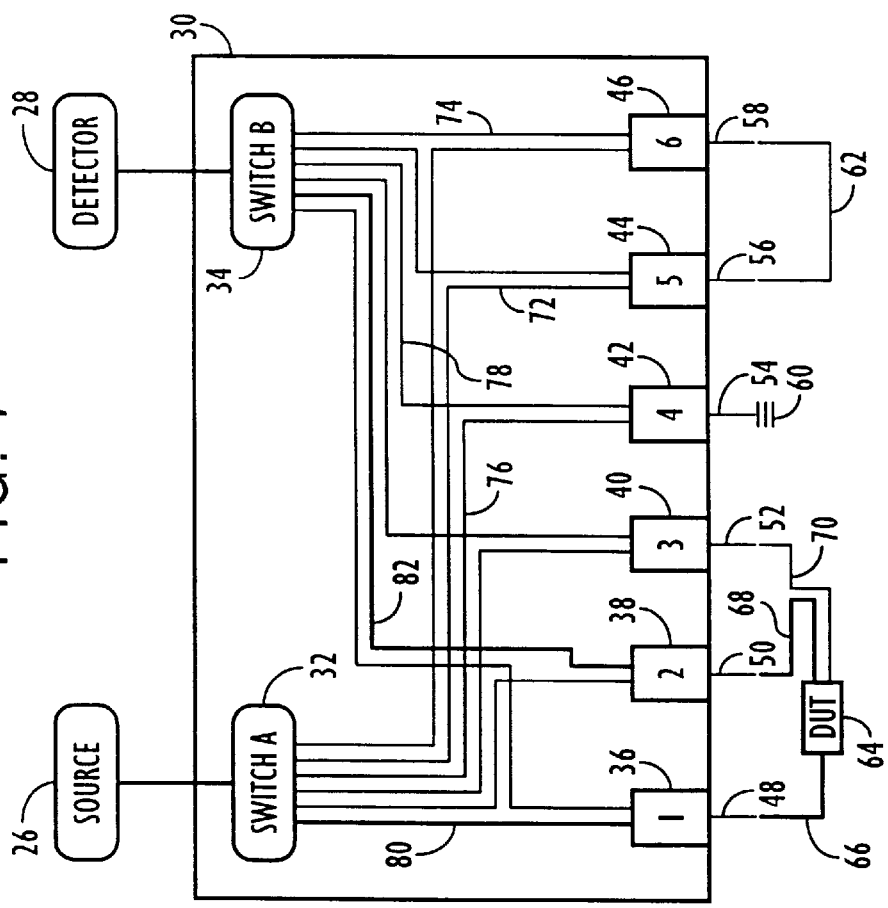
FIG. 7 is an illustration of the next step in the testing procedure to obtain the optical power distribution values from lead 1 to lead 2 of the device under test.

FIG. 7 is the next step in this testing procedure to obtain the optical power distribution values for each of the leads 66, 68, 70 of the device under test 64. To determine optical power transmitted from lead 1 (reference numeral 66) to lead 2 (reference numeral 68), switch A 32 connects the source 26 to port 1 (reference numeral 48) via optical directional coupler 36 and optical path 80. In addition, switch B 34 connects port 2 (reference numeral 50) to the detector 28 via optical directional coupler 38 and optical path 82. All optical measurements from lead 1 (reference numeral 66) to lead 2 (reference numeral 68) can now be made.

For example, the types of optical measurements made by the testing system may include one or more of the optical tests described in Bellcore 1209 and 1221, incorporated herein by reference.

Figure 8:
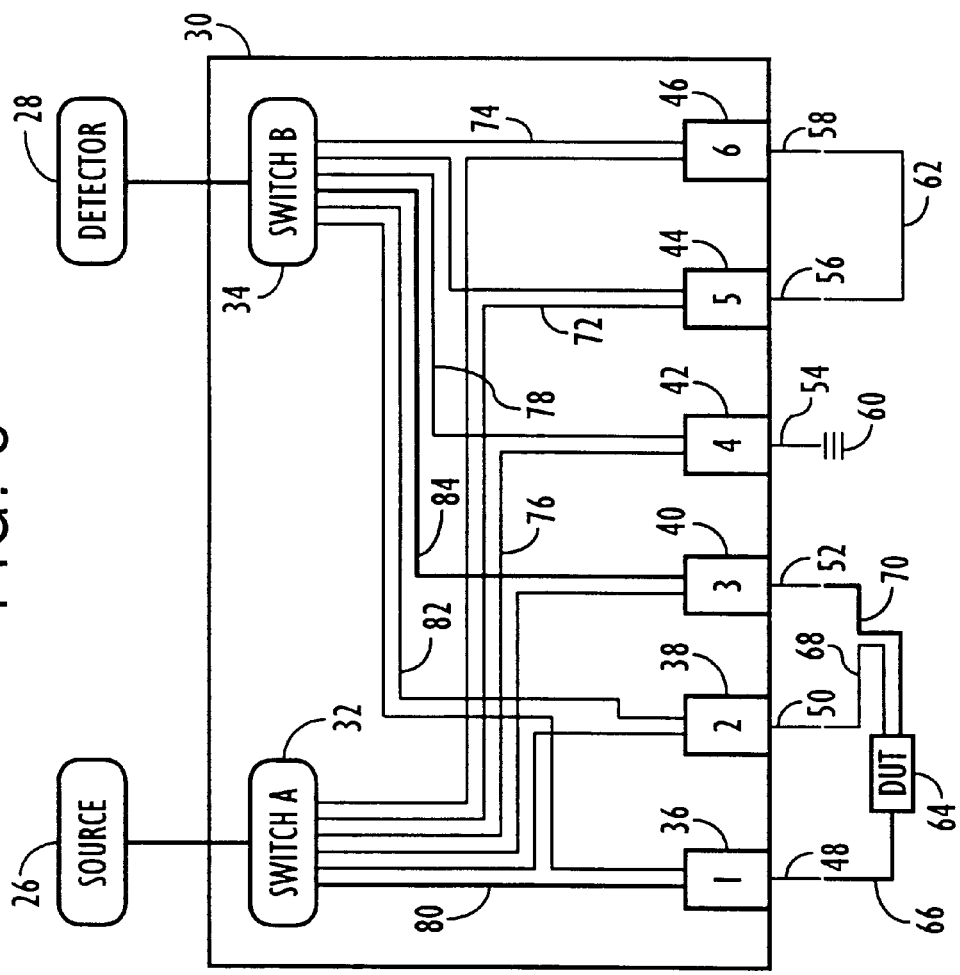
FIG. 8 is an illustration of the next step in the testing procedure to determine optical power transmitted from lead 1 to lead 3 of the device under test.

FIG. 8 is the next step in this testing procedure to obtain the optical power distribution values for each of the leads 66, 68, 70 of the device under test 64. To determine optical power transmitted from lead 1 (reference numeral 66) to lead 3 (reference numeral 70), switch A 32 connects the source 26 to port 1 (reference numeral 48) via optical directional coupler 36 and optical path 80. In addition, switch B 34 connects port 3 (reference numeral 52) to the detector 28 via optical directional coupler 40 and optical path 84. All optical measurements from lead 1 (reference numeral 66) to lead 3 (reference numeral 70) can now be made.

Figure 9:
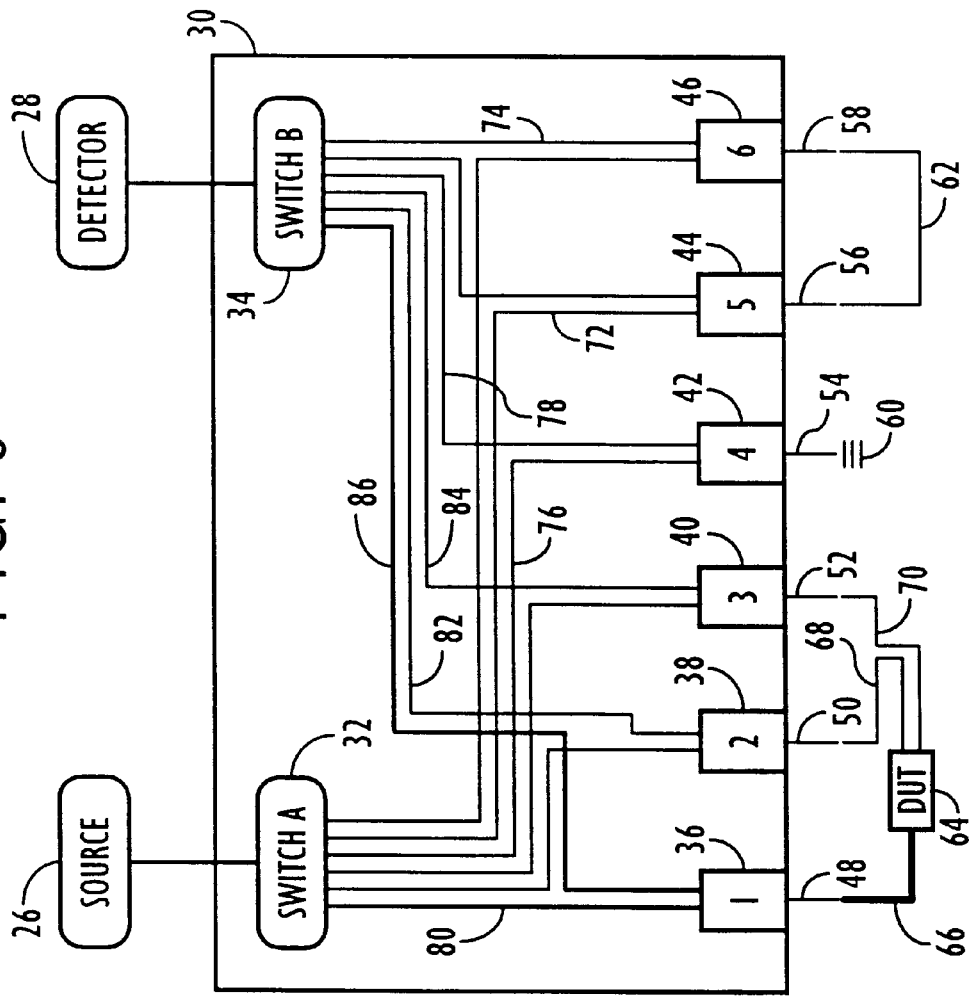
FIG. 9 is an illustration of the next step in the testing procedure to determine the optical power transmitted from lead 1 and reflected by the test device back to lead 1 of the device under test.

FIG. 9 is the next step in this testing procedure to obtain the optical power distribution values for each of the leads 66, 68, 70 of the device under test 64. To determine optical power transmitted from lead 1 (reference numeral 66) reflected back to lead 1, switch A 32 connects the source 26 to port 1 (reference numeral 48) via optical directional coupler 36 and optical path 80. In addition, switch B 34 connects port 1 (reference numeral 48) to the detector 28 via optical directional coupler 36 and optical path 86. All optical measurements from lead 1 (reference numeral 66) reflected by the test device back to lead 1 can now be made.

Figure 10:
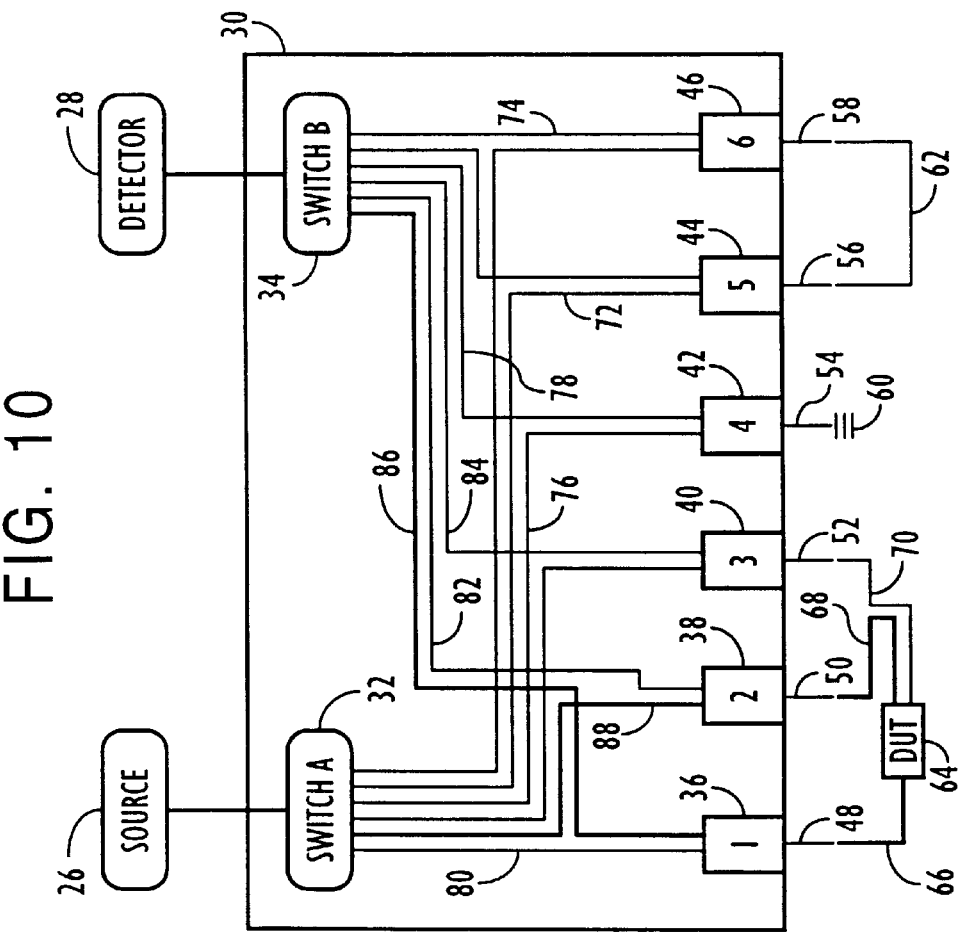
FIG. 10 is an illustration of the next step in the testing procedure to determine the optical power transmitted from lead 2 to lead 1 of the device under test.

FIG. 10 is the next step in this testing procedure to obtain the optical power distribution values for each of the leads 66, 68, 70 of the device under test 64. To determine optical power transmitted from lead 2 (reference numeral 68) to lead 1 (reference numeral 66), switch A 32 connects the source 26 to port 2 (reference numeral 50) via optical directional coupler 38 and optical path 88. In addition, switch B 34 connects port 1 (reference numeral 48) to the detector 28 via optical directional coupler 36 and optical path 86. All optical measurements from lead 2 (reference numeral 68) to lead 1 (reference numeral 66) can now be made.

Figure 11:
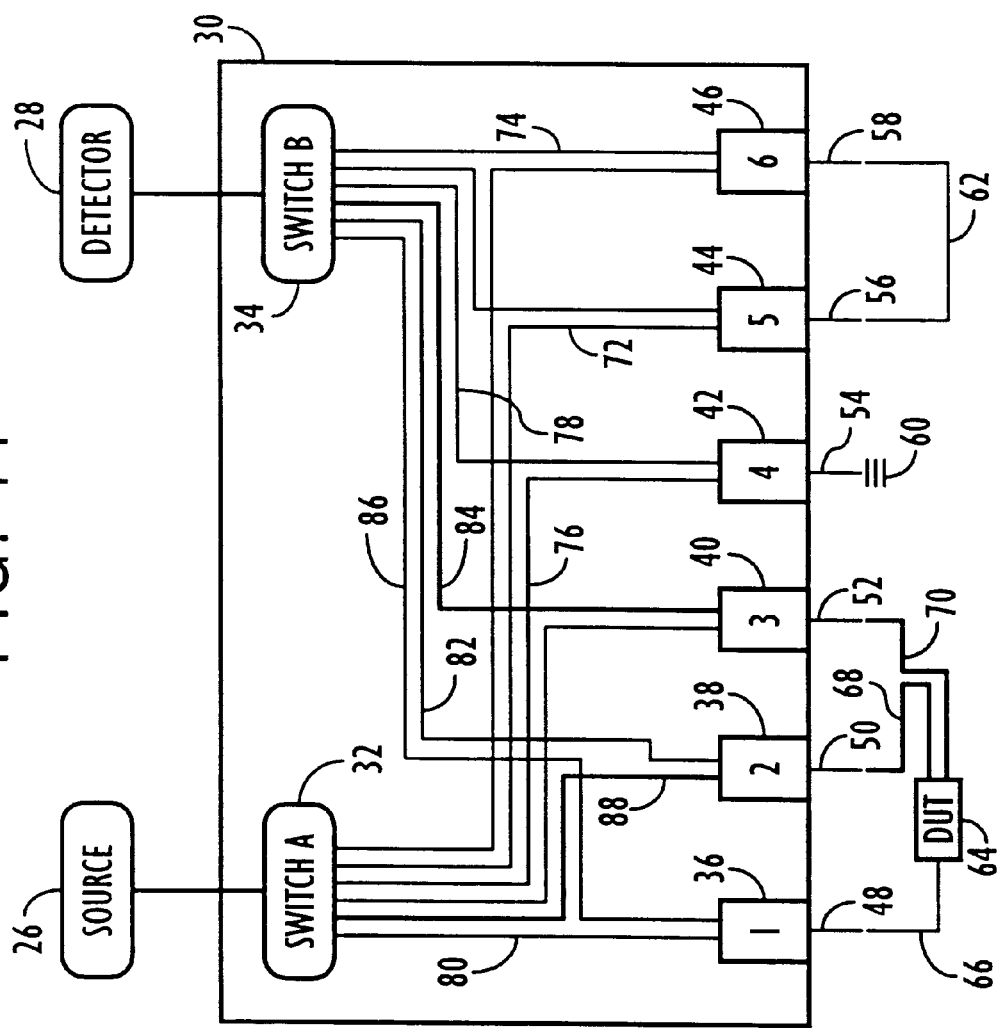
FIG. 11 is an illustration of the next step in the testing procedure to determine the optical power transmitted from lead 2 to lead 3 of the device under test.

FIG. 11 is the next step in this testing procedure to obtain the optical power distribution values for each of the leads 66, 68, 70 of the device under test 64. To determine optical power transmitted from lead 2 (reference numeral 68) to lead 3 (reference numeral 70), switch A 32 connects the source 26 to port 2 (reference numeral 50) via optical directional coupler 38 and optical path 88. In addition, switch B 34 connects port 3 (reference numeral 52) to the detector 28 via optical directional coupler 40 and optical path 84. All optical measurements from lead 2 (reference numeral 68) to lead 3 (reference numeral 70) can now be made. The determination of optical power transmitted from lead 2 reflected by the test device back to lead 2 is similar to that shown in FIG. 9.

Figure 12:
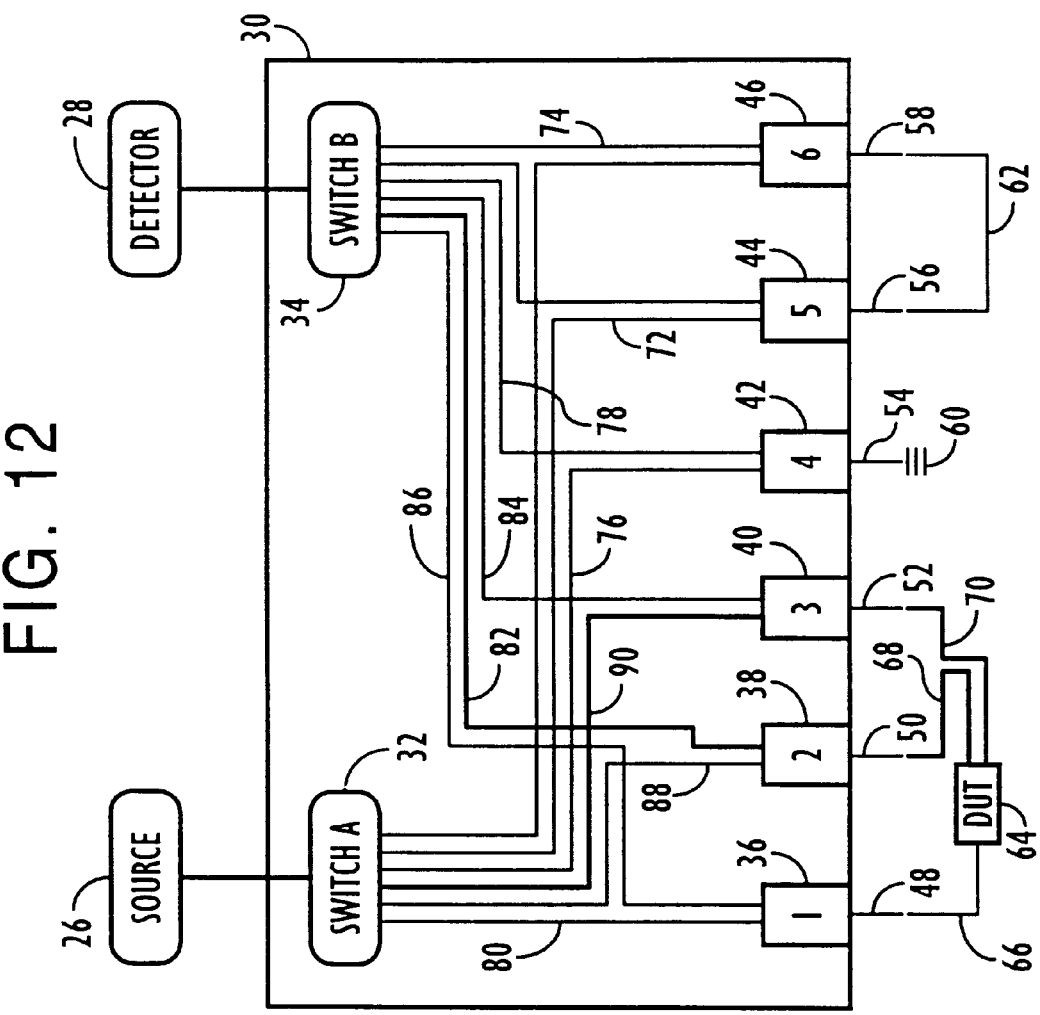
FIG. 12 is an illustration of the next step in the testing procedure to determine the optical power transmitted from lead 3 to lead 2 of the device under test.

FIG. 12 is the next step in this testing procedure to obtain the optical power distribution values for each of the leads 66, 68, 70 of the device under test 64. To determine optical power transmitted from lead 3 (reference numeral 70) to lead 2 (reference numeral 68), switch A 32 connects the source 26 to port 3 (reference numeral 52) via optical directional coupler 40 and optical path 90. In addition, switch B 34 connects port 2 (reference numeral 50) to the detector 28 via optical directional coupler 38 and optical path 82. All optical measurements from lead 3 (reference numeral 70) to lead 2 (reference numeral 68) can now be made.

The determination of optical power transmitted from lead 3 reflected by the test device back to lead 3 is similar to that shown in FIG. 9, and the determination of optical power transmitted from lead 3 to lead 1 is similar to that shown in FIG. 8.

At this point, all optical distribution measurements from each lead to all other leads have been made. Using these optical measurements and the initial reference measurements, all relevant Bellcore 1209 and/or 1221 optical calculations, for example, can be performed.

The following figures show an example of a test apparatus that can be used to test a greater number of devices, and/or devices with a greater number of leads.

Figure 13:
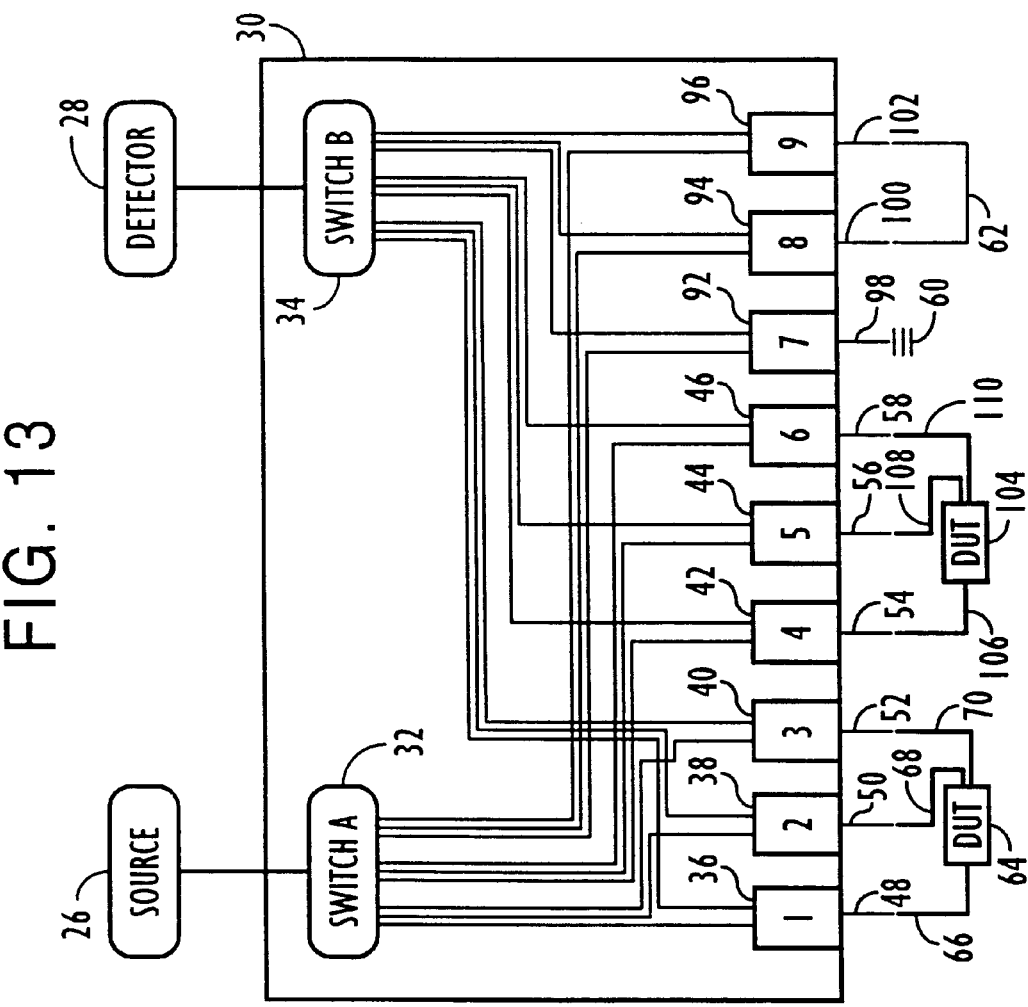
FIG. 13 is a schematic diagram of an optical testing apparatus shown connected to multiple 1×2 FBT couplers to be tested.

FIG. 13 shows a schematic diagram of an optical testing apparatus connected to multiple 1×2 FBT couplers to be tested. To increase efficiency, one or more devices can be tested while other devices are being connected and/or disconnected. For example, optical switching assembly 30 includes two 1×N optical switches 32, 34 (shown as switch A and switch B) and a set of 1×2 optical directional couplers 36, 38, 40, 42, 44, 46, 92, 94 and 96 (shown as small boxes 1–9), each connected to both optical switches 32, 34. Note that an additional three optical directional couplers 92, 94, 96 are included.

A set of ports 48, 50, 52, 54, 56, 58, 98, 100, 102 (shown as small black vertical lines below the 1–2 couplers), attached to the optical couplers 36, 38, 40, 42, 44, 46, 92, 94, 96 are used to connect external devices to the optical switching assembly 30. Each optical coupler 36, 38, 40, 42, 44, 46, 92, 94, 96 connects each port 48, 50, 52, 54, 56, 58 98, 100, 102 to both switch A 32, which directs input from the source 26, and switch B 34, which directs output to the detector 28. The leads 66, 68, 70 of the device under test 64 are preferably fusion spliced to ports 48, 50, 52, respectively. In addition, while device under test 64 is being tested, device under test 104 can be connected and/or disconnected to/from optical switching assembly 30. More specifically, leads 106, 108, 110 of the device under test 104 can be fusion spliced to ports 54, 56, 58, respectively, for subsequent testing of, or simultaneous testing with, device under test 64.

Figure 14:
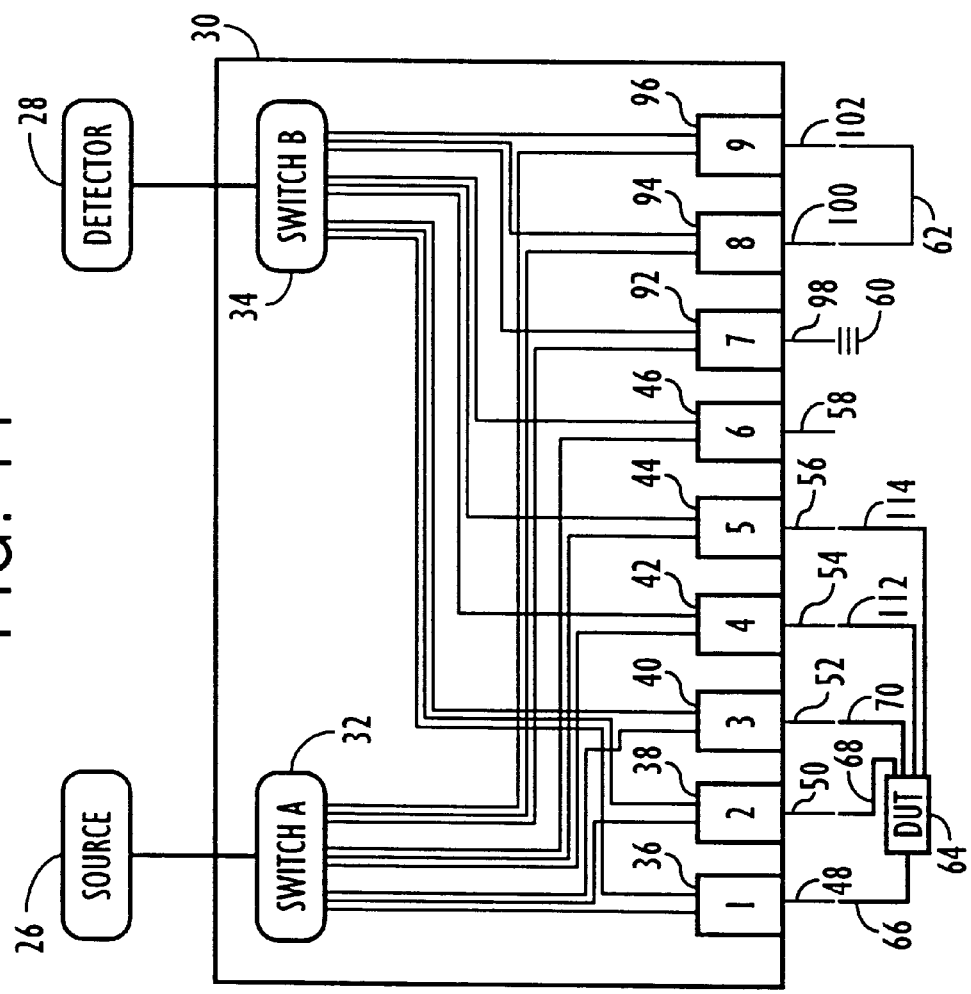
FIG. 14 is a schematic diagram of the optical testing apparatus, shown in FIG. 13, shown connected to a 1×4 FET coupler to be tested.

FIG. 14 shows a schematic diagram of the optical testing apparatus, shown in FIG. 13, connected to a 1–4 FBT coupler to be tested. Optical switching assembly 30 includes two 1×N optical switches 32, 34 (shown as switch A and switch B) and a set of 1×2 optical directional couplers 36, 38, 40, 42, 44, 46, 92, 94 and 96 (shown as small boxes 1–9), each connected to both optical switches 32, 34. Note that an additional three optical directional couplers 92, 94, 96 are included.

A set of ports 48, 50, 52, 54, 56, 58, 98, 100, 102 (shown as small black vertical lines below the 1×2 couplers), attached to the optical couplers 36, 38, 40, 42, 44, 46, 92, 94, 96 are used to connect external devices to the optical switching assembly 30. Each optical coupler 36, 38, 40, 42, 44, 46, 92, 94, 96 connects each port 48, 50, 52, 54, 56, 58 98, 100, 102 to both switch A 32, which directs input from the source 26, and switch B 34, which directs output to the detector 28. The leads 66, 68, 70, 112, 114 of the device under test 64 can be fusion spliced to ports 48, 50, 52, 54, 56, respectively. Other standard means of connecting the leads of the device under test to the ports may also be used. For example, instead of fusion splicing, optical connectors, mechanical splices, free space connection, waveguides and the like, may be used.

Accordingly, the optical testing apparatus illustrated in FIG. 14 is able to automatically test a device under test that comprises a 1–4 FBT coupler, without requiring various connection steps during the testing process to complete the predetermined testing steps.

While the above examples illustrated principally testing a 1×2 FBT coupler, any size and/or number of FBT couplers, fiber optic devices, testing devices, sources, detectors and/or other devices requiring testing can be used with the optical testing apparatus described herein. Similarly, any size and/or number of optical directional couplers can also be used. Further, any number and/or size of optical switches can also be used. The source and detector described herein may be of any suitable device. The FBT couplers can also be substituted with any other suitable switching mechanism.

For example, more than one set of optical switches can be used to test more than one device under test substantially simultaneously and/or to perform more than one test substantially simultaneously. For example, if the device under test 64 has lead 66 connected to optical switch 32 and source 26, lead 68 connected to switch 34 associated with detector 28, and lead 70 connected to an additional optical switch and detector, the testing system will be able to simultaneously perform two test procedures, on lead 68 and lead 70, of the device under test 64.

Similarly, use of multiple sets of sources and associated optical switches and multiple sets of detectors and associated optical switches permits multiple devices under test to be tested substantially simultaneously, and/or devices under test requiring multiple sources and/or detectors, as needed. For example, some 2×2 devices under test, such as erbium-doped fiber amplifiers, require two different simultaneous sources and two different simultaneous detectors for performing the test procedures.

All switches described herein that are separate entities may, of course, be combined into a single switching device with additional inputs/outputs. For example, switches 32, 34 may be combined into a single switching assembly providing similar functions. Optical couplers 36, 38, 40, 42, 44, 46, 92, 94, 96 could also be combined into a single optical coupler/switch with the required amount of input/output ports and/or similar functionality. That is, the above example merely provides a logical separation of switching devices, and other functionally similar switching devices are contemplated or within the scope of the optical switching apparatus described herein. Further, the coupler(s) can be any standard junction and/or switch that provides a similar function. In addition, the coupler(s) and/or junction and/or switch can be of any dimension, such as 1×n. For example, if standard 1×n optical switches are substituted for the coupler(s) 36, 38, 40, 42, 44, or 46, a 1×2 optical directional coupler may be required between the source 26 and optical switches 32, 34 to allow back reflection to be measured.

The source and detector components described herein may comprise any suitable device for performing a predetermined testing function. Thus, for testing of fiber optic devices, the source may be a laser; however, for testing other devices the source may comprise another testing/polling device used to test the accuracy of a predetermined circuit, semiconductor device, conductor, and the like. In addition, the source and detector components may be a single device providing similar and/or simultaneous functionality as separate source and detector components. Thus, various testing devices and/or devices under test may be used with the switching apparatus described herein.

The source, detector and fiber optic device under test may also be connected to various different parts/ports of the switching assembly described herein. That is, the specific configuration used in the example discussed herein may be altered to suit different needs. For example, the positions of the source and detector may be switched. Similarly, it is also possible to switch the detector and/or the source with the fiber optic device, depending on the number of leads requiring testing and the specific testing program being implemented.

Additional test devices such as sources and/or detectors may also be used. In this situation, the additional sources and/detectors may be connected in the conventional manner and/or in the manner described herein for maximum and/or simultaneous utilization of same. For example, an additional source(s) may be connected to an additional optical switch that selectively connects the additional source(s) to each of the ports. Similarly, an additional detector(s) may be connected to an additional optical switch that selectively connects the additional detector(s) to each of the ports.

Standard means of connecting any of the components in the switching assembly including the source, detector and/or device under test may be used. For example, fusion splicing, optical connectors, mechanical splices, free space connection, waveguides and the like, may be used to connect components.

In view of the advantages of the switching assembly described herein, standard automated programs run by a computer, microprocessor and the like, can be used in combination and/or successively to fully test the fiber optic device. That is, the present invention allows various testing procedures to be implemented without requiring the test setup and/or connections to be altered prior to completion of the entire combination of testing procedures.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A switching assembly for selectively connecting first and second test devices to at least one device under test, comprising:

first and second groups of optical paths, each optical path having a first and second end;

a first switch selectively connecting the first test device to the first end of one of the first groups of optical paths;

a second switch selectively connecting the second test device to the first end of one of the second groups of optical paths; and a plurality of junctions, each having a lead, at least one lead connected to the at least one device under test, said plurality of junctions connecting at least one of the second end of the first group of optical paths and at least one of the second end of the second group of optical paths to the at least one lead, wherein at least one of the first and second test devices performs at least two testing procedures to the at least one device under test connected to at least one lead without requiring the device under test to be disconnected from said at least one lead prior to completing the at least two testing procedures.

2. A switching assembly of claim 1, wherein at least one of said plurality of junctions is a passive fiber optic directional coupler.

3. A switching assembly of claim 1, wherein at least one of said first and second switches is a fiber optic switch.

4. A switching assembly of claim 1, wherein at least one of said first and second groups of optical paths is an optical fiber.

5. A switching assembly of claim 1, wherein said first test device is a light source and said second test device is a detector.

6. A switching assembly of claim 1, wherein the at least one device under test comprises at least one of a wavelength division multiplexer, a wideband fiber optic coupler, a coupler, a switch, a filter, an attenuator, a waveguide, a fiber optic sensor, a sensor, a fiber optic coupler, an optical fiber, an optical connector, a fiber optic connector, an optical amplifier, a fiber optic amplifier, an optical switch, a fiber optic switch and a polarizer.

7. A switching assembly of claim 1, wherein one of said plurality of junctions is connected to a reference reflector.

8. A switching assembly of claim 7, wherein two of said plurality of junctions are at least one of mechanically and optically connected to each other to at least one of calibrate and obtain a reference measurement for at least one of the first and second test devices.

9. A switching assembly of claim 1, wherein said plurality of junctions comprise a first junction connected to a reference reflector, second and third junctions optically connected to each other, and an additional junction for each port of the device under test.

10. A switching assembly of claim 1, wherein two of said plurality of junctions are optically connected to each other to at least one of calibrate and obtain a reference measurement for at least one of the first and second test devices.

11. An optical switching assembly for selectively connecting an optical source and a detector to at least one fiber optic device, comprising:

first and second groups of optical paths, each optical path having a first and second end;

a first optical switch selectively connecting the optical source to the first end of one of the first groups of optical paths;

a second optical switch selectively connecting the detector to the first end of one of the second groups of optical paths; and a plurality of junctions, each having a lead, at least one lead connected to said at least one fiber optic device, said plurality of junctions connecting at least one of the second end of the first group of optical paths and at least one of the second end of the second group of optical paths to the at least one lead wherein the optical source and the detector together are configured to perform at least two testing procedures to the at least one fiber optic device connected to at least one lead without requiring the at least one fiber optic device to be disconnected from said at least one lead prior to completing the at least two testing procedures.

12. An optical switching assembly of claim 11, wherein at least one of said first and second groups of optical paths is an optical fiber.

13. A switching assembly of claim 11, wherein the at least one device under test comprises at least one of a wavelength division multiplexer, a wideband fiber optic coupler, a coupler, a switch, a filter, an attenuator, a waveguide, a fiber optic sensor, a sensor, a fiber optic coupler, an optical fiber, an optical connector, a fiber optic connector, an optical amplifier, a fiber optic amplifier, an optical switch, a fiber optic switch and a polarizer.

14. A switching assembly of claim 11, wherein one of said plurality of junctions is connected to a reference reflector.

15. A switching assembly of claim 11, wherein two of said plurality of junctions are optically connected to each other to at least one of calibrate and obtain a reference measurement for at least one of the first and second test devices.

16. A switching assembly of claim 11, wherein said plurality of junctions comprise a first junction connected to a reference reflector, second and third junctions optically connected to each other, and another junction for each port of the device under test.

17. A switching assembly of claim 11, wherein two of said plurality of junctions are optically connected to each other to at least one of calibrate and obtain a reference measurement for at least one of the first and second test devices.

18. A switching assembly of claim 1, wherein said plurality of junctions comprise a first junction connected to a reference reflector, second and third junctions optically connected to each other, and an additional junction for each port of the device under test.

19. An optical switching assembly for selectively connecting an optical source and a detector to at least one fiber optic device, comprising:

first and second groups of optical paths, each optical path having a first and second end;

an optical switch selectively connecting the optical source to the first end of one of the first groups of optical paths, and selectively connecting the detector to the first end of one of the second groups of optical paths; and a junction device having at least one lead connected to said at least one fiber optic device, said junction device connecting at least one of the second end of the first group of optical paths and at least one of the second end of the second group of optical paths to the at least one lead, wherein the optical source and the detector together are programmed to perform at least two testing procedures to the at least one fiber optic device connected to at least one lead without requiring the at least one fiber optic device to be disconnected from said at least one lead prior to completing the at least two testing procedures.

20. A switching assembly of claim 19, wherein the at least one fiber optic device comprises at least one of a wavelength division multiplexer, a wideband fiber optic coupler, a coupler, a switch, a filter, an attenuator, a waveguide, a fiber optic sensor, a sensor, a fiber optic coupler, an optical fiber, an optical connector, a fiber optic connector, an optical amplifier, a fiber optic amplifier, an optical switch, a fiber optic switch and a polarizer.

21. A switching assembly of claim 19, wherein said junction device comprises another lead optically connected to a reference reflector.

22. A switching assembly of claim 21, wherein said junction device comprises first and second leads optically connected to each other to at least one of calibrate and obtain a reference measurement for at least one of the optical source and the detector.

23. A switching assembly of claim 11, wherein said junction device comprises a first junction optically connected to a reference reflector, second and third junctions optically connected to each other, and another junction for each port of the device under test.

24. A switching assembly of claim 19, wherein two of said junction device comprises first and second junctions optically connected to each other to at least one of calibrate and obtain a reference measurement for at least one of the optical source and the detector.

* * * * *